United States Patent
Bastiaansen et al.

(10) Patent No.: US 8,481,146 B2
(45) Date of Patent: *Jul. 9, 2013

(54) INKJETTABLE POLYMERIZABLE LIQUID CRYSTALLINE MIXTURE

(75) Inventors: Cees Bastiaansen, Montfort (NL); Thijs Meijer, Eindhoven (NL); Robert Jan Vrancken, Eindhoven (NL)

(73) Assignee: Technische Universiteit Eindhoven, Eindhoven (NL)

( * ) Notice: Subject to any disclaimer, the term of this patent is extended or adjusted under 35 U.S.C. 154(b) by 170 days.

This patent is subject to a terminal disclaimer.

(21) Appl. No.: 12/530,633

(22) PCT Filed: Mar. 8, 2008

(86) PCT No.: PCT/EP2008/001868
§ 371 (c)(1),
(2), (4) Date: Sep. 10, 2009

(87) PCT Pub. No.: WO2008/110317
PCT Pub. Date: Sep. 18, 2008

(65) Prior Publication Data
US 2010/0104826 A1   Apr. 29, 2010

(30) Foreign Application Priority Data

| Mar. 13, 2007 | (EP) | ..................... 07005119 |
| Mar. 13, 2007 | (EP) | ..................... 07005120 |
| Mar. 13, 2007 | (EP) | ..................... 07005122 |
| Mar. 13, 2007 | (EP) | ..................... 07005123 |

(51) Int. Cl.
*C09K 19/52* (2006.01)
*C09K 19/00* (2006.01)
*C09D 5/00* (2006.01)
*G03G 7/00* (2006.01)

(52) U.S. Cl.
USPC ..... 428/195.1; 428/1.1; 428/1.2; 252/299.01; 252/500; 252/512; 252/62.51 R

(58) Field of Classification Search
USPC ......... 252/500, 62.5 R, 299.01, 503; 428/1.1, 428/1.2
See application file for complete search history.

(56) References Cited

U.S. PATENT DOCUMENTS

| 2002/0017633 A1 | 2/2002 | Goulding et al. |
| 2002/0064683 A1 * | 5/2002 | Okada et al. ................. 428/690 |
| 2002/0102366 A1 | 8/2002 | Sato et al. |
| 2004/0039150 A1 * | 2/2004 | Shin et al. ..................... 528/170 |
| 2004/0155221 A1 | 8/2004 | Hammond-Smith et al. |
| 2008/0197620 A1 * | 8/2008 | Spencer et al. ................. 283/81 |

FOREIGN PATENT DOCUMENTS

| EP | 1336874 A2 | 8/2003 |
| EP | 1422283 A1 | 5/2004 |
| WO | WO2004/025337 A1 | 3/2004 |

\* cited by examiner

*Primary Examiner* — Mark Ruthkosky
*Assistant Examiner* — Laura C Dettinger
(74) *Attorney, Agent, or Firm* — Hammer & Associates, P.C.

(57) ABSTRACT

A polymerizable mixture for ink jetting, having liquid crystalline phases comprising the following components:
a) 50-80 wt % mono-functional LCP's,
b) 10-50 wt % of a higher functional LCP's,
f) 0.01-5 wt % initiators, preferably below 1%
g) 0.01-5 wt % inhibitors, preferably below 1%
h) 0-20 wt % additives, preferably below 10 wt %,
with the provision that the total amount of the components is 100 wt %, characterized in that the polymerizable mixtures has a viscosity smaller than 0.015 Pa s at 100° C. and yet remaining thermally stable.

17 Claims, No Drawings

INKJETTABLE POLYMERIZABLE LIQUID CRYSTALLINE MIXTURE

The present invention pertains to mixtures containing polymerizable liquid crystals and to a process for manufacturing the same in particular as authentication features for prevention of counterfeiting of documents and/or products.

In order to prevent counterfeiting, there is a continuing need to secure valuable documents and/or products. Adding authentication features, which are very difficult to forge but preferably easy to inspect, to these products helps against counterfeiting. There are many authentication features known in the art. Many are based on well-known and thus non-distinct optical effects. Examples of optical authentication features are holograms, based on diffracting structures, watermarks, based on thickness differences in semi-opaque substrates and fluorescent markings. Furthermore, gaining access to the materials and technology to produce these or highly similar effects is often straightforward. The strength of authentication features produced with Polymerizable Liquid Crystals (LCP's) is the many possible optical effects, which are much less known and very difficult to imitate.

Polymerizable Liquid Crystals (LCP's) are a class of materials, which exhibit one or more liquid crystalline phases, such as a nematic, smectic or chiral nematic (also called cholesteric) phase, within a certain temperature range. Furthermore, LCP's can be polymerized due to reactive groups, which are part of the molecule. Before polymerization, LCP's are monomers, but also after polymerization the resulting polymers are commonly referred to as LCP's. In the text, where LCP's are mentioned the monomer form is referred to; the polymer form is referred to as LCP polymer. Moreover, the skilled person is able to differentiate between the polymeric and monomeric LCP's in the context of the specification and by using his common knowledge. Polymerization of LCP's can be induced spontaneously at elevated temperatures or aided by means of suitable initiators, such as for instance photo-initiators or thermal initiators. Common examples of reactive groups are acrylates, methacrylates, epoxies, oxethanes, vinyl-ethers, styrenes and thiol-enes. Here, monomers which by means of reactive end groups have the ability to form links with two other molecules are called mono-functional, since two links are the minimum number required to form a polymer. Monomers with the ability to form links with more than two other molecules are called higher functional.

It is possible to print flakes of LCP polymers, which are formulated into an ink, but these flakes are expensive and difficult to produce as well as to apply. Such flakes are for instance disclosed in EP 1 519 997 and EP 0 968 255. The production process of flakes consists of a number of time-consuming steps before the flakes are polymerized and broken into pieces of suitable size. Afterwards, these flakes are mixed into a transparent polymerizable binder. Due to the average size of the flakes in the binder as well as the variability of the flake geometry, the print resolution is limited. Furthermore, flakes are not suited for inkjet printing as the flakes clog the conduits and nozzles in the inkjet head. Furthermore, the optical effects are not as uniform nor as clear and striking as a single uniform layer of LCP polymer.

Another method to create LCP-based authentication features is by inkjet printing of LCP's to form features with distinct optical properties. Furthermore, inkjet printing allows that each print is made unique, which is especially useful for instance when a need exists to track and trace each individual document or product or to include specific information such as biometric information. The possibility of combining LCP-based optical effects and inkjet printing is only mentioned in very few documents, which are all non-specific with regards to the actual requirements.

Printing LCP's with solvents has been described e.g. in EP1381520. Solvents are materials, which cause the LCP's to dissolve in them and together form a solution. Furthermore, such solvents are usually meant to evaporate after processing but before polymerization, so the solvent is not contained in any significant amount in the final product. Examples of commonly employed solvents for LCP's are xylene, toluene and acetone. The problem with ink jetting of LCP's is that commercial inkjet printing equipment is unable to reproducibly print LCP's if these are dissolved in solvents. Ink jetting solvent-based mixtures leads to a drying effect, which is detrimental to the homogeneity of the prints, the so-called coffee stain effect. Furthermore the use of solvents can affect the substrates on which the LCP's are printed and also it can dissolve any previously printed LCP structure on the substrate before polymerization. When printing structures containing different materials stemming from different reservoirs, the use of solvent based mixtures gives rise to significant mixing of the materials on the substrate, leading to effects such as 'colour bleeding' and thus highly blurred images.

Solvents can also chemically attack parts of the print head or heads and conduits in the printing system, in particular polymer-based parts. These solvents also often evaporate at or near the nozzle, leading to clogging. Furthermore, such solvents are often harmful to the equipment because of corrugation as well as to people and to the environment due to toxicity and therefore require extensive equipment for air filtration near the printing equipment. Furthermore, heating of the printed materials to enhance evaporation and thus production speed is highly desirable, requiring heating installations within the production equipment which increase complexity and cost and also can be detrimental to the surrounding equipment as well as the substrates on which is being printed.

For these reasons, a need exists to eliminate solvents from the process of inkjet printing of LCP's.

Printing of LCP's without solvents is known from EP1491332. However, this document does not describe or teach specific materials or steps to enable the inkjet printing of LCP's or potential problems related to it. In particular, mixtures containing LCP's but without solvents are hardly manageable with the currently available production-ready equipment. Only with highly dedicated inkjet printing equipment is it possible to print LCP's, and only at or above 140° C. At such temperatures however, LCP's start to polymerize spontaneously through thermal excitation of the reactive groups or the initiators in the mixture.

To be able to print a mixture with inkjet printing it is needed that the mixture which is printed is at least chemically stable for the time it remains in the inkjet head or reservoir at the temperature at which the mixture is printed, which is in the order of minutes to weeks depending on the printing speed and printer usage, It is the object of the present invention to overcome the limitations of the prior art by describing a mixture containing LCP's, which can be reproducibly printed with state-of-the art equipment. Furthermore the mixture needs to be polymerizable and it should not phase-separate.

Surprisingly, it has been found that the object of the present invention can be achieved with mixtures comprising the following components:

a) 50-80 wt % mono-functional LCP's,
b) 10-50 wt % of a higher functional LCP's,
f) 0.01-5 wt % initiators, preferably below 1 wt %
g) 0.01-5 wt % inhibitors, preferably below 1 wt %
h) 0-20 wt % additives, preferably below 10 wt %,
with the provision that the total amount of the components is 100 wt % and wherein the polymerizable mixtures have a viscosity smaller than 0.015 Pa·s (which equals 15 mPa·s) at 100° C. and yet remaining thermally stable.

It is noted that EP1681586 discloses liquid crystalline layers as birefringent marking for decorative and security applications. This publication also mentions the possibility of using droplets of liquid crystal materials from melt, without going to any details regarding an inkjet process.

Preferably, the polymerizable mixture in addition comprises c) 10-30 wt % liquid crystalline inert monomers, preferably from 15-25 wt %. Even more preferred the liquid crystalline inert monomer c) is a non-chiral monomer.

It is preferred, that the polymerizable mixture additionally comprises d) 0.01-30 wt % non-liquid crystalline (mono- or higher) functionalized monomers.

It is also preferred that the inventive polymerizable mixture in addition comprises e) 0.01-30 wt % non-liquid crystalline inert monomers, preferably from 5 to 15 wt %.

Components c), d) and e) can either be present together or separately in the mixture. It goes without saying, however, that the total amount of components forming the polymerizable mixture is always 100 wt. %.

For the inventive mixture it is preferred that the components a) (the mono-functional LCP's) and/or b) (the higher functional LCP's) are acrylates.

Due to the application in ink jet printers it is particularly preferred that the polymerizable mixture is solvent-free.

Consequently, the polymerizable mixture is particularly suitable for hot melt printing by inkjet printers.

For the inventive mixture and also for a process for its manufacturing it is preferred if the components from e) through f) are selected such that they do not prohibit the alignment of the liquid crystals from components a) through d).

Preferably, for the mixture and for the process the components from a), b) and d) are functionalized to form a polymer structure, more preferably due to possessing compatible types of functional groups, very preferable by possessing the same type of functional group.

In a further preferred embodiment for the mixture and for the process it is desired that the components a) through h) are selected such that phase-separation is suppressed at least only before polymerization but preferably also during polymerization that the mixture is homogeneous on the scale of individual ink jetted drops.

It is noted that EP 1 422 283 discloses LC materials for printing without the need for high temperatures and without solvents. EP 1 422 283 does not disclose any temperature range. However the application discloses that the preferred viscosity of the LC mixture is 30 to 2000 centistokes, very preferably from 400-1000. Commercial standard inkjet printers need viscosities less than 15 mPa·s which equals 15 centistokes for a fluid of density 1 kg/liter.

By using the inventive mixture ink jetting of solvent-free LCP's is easily possible. The viscosity is not higher than 15 mPa·s at 100° C., and if the mixture is heated to decrease the viscosity, it remains thermally stable. Ink jet printing below 120° C., preferably below 100° C., very preferably 80° C. is possible without problems, resulting in distinctive and reproducible optical effects.

A particular embodiment of the invention is the following mixture A, containing;

a) 55.5 wt% mono-functional LCP acrylate

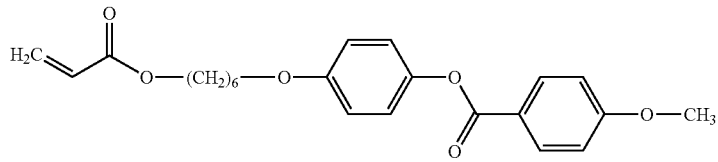

b) 23.8 wt% di-functional LCP acrylate

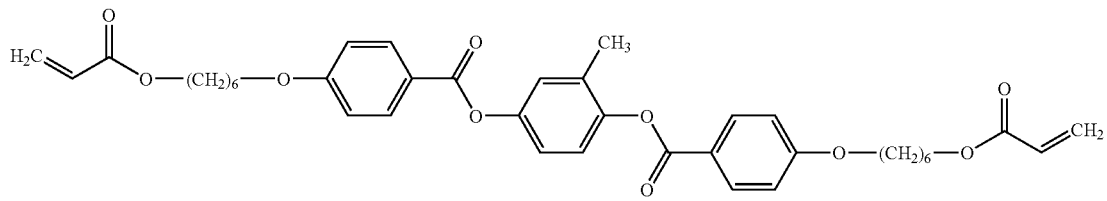

c) 20% non-reactive LC monomer

f) 0.6 wt% photo-initiator

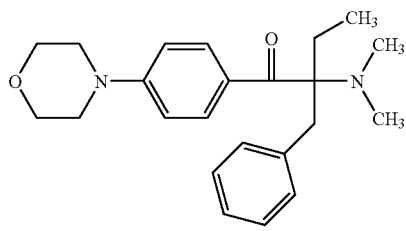

g) 0.1 wt% inhibitor

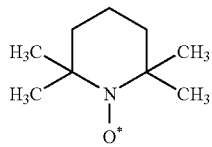

Components a, b, c, f and g are subsequently added in a glass vial and the mixture is magnetically stirred for 15 minutes at 70° C. The resulting mixture is clear and fluid at 70° C. The viscosity of this mixture was measured using a rheometer using a parallel plate geometry and subsequently heated in an nitrogen flushed oven at 100° C. for three weeks, after which the viscosity was measured again.

The results from these measurements are shown in table 1. It is clear that the mixture has a stable viscosity less than 15 mPa·s at 100° C. before and after heating. After heating the mixture was furthermore determined to still be photo-polymerizable and also still liquid crystalline and not phase-separated.

TABLE 1

| viscosity of mixture A before and after heating at 100° C. in a nitrogen environment for 3 weeks | | | |
|---|---|---|---|
| | 80° C. | 100° C. | 120° C. |
| Viscosity of mixture A before heating | 24 mPa · s | 14 mPa · s | 9 mPa · s |
| Viscosity of mixture A after heating | 24.6 mPa · s | 14.2 mPa · s | 8.7 mPa · s |

Another preferred embodiment is the following mixture B:

a)

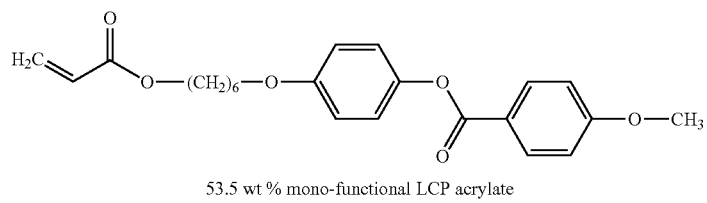

53.5 wt % mono-functional LCP acrylate b)

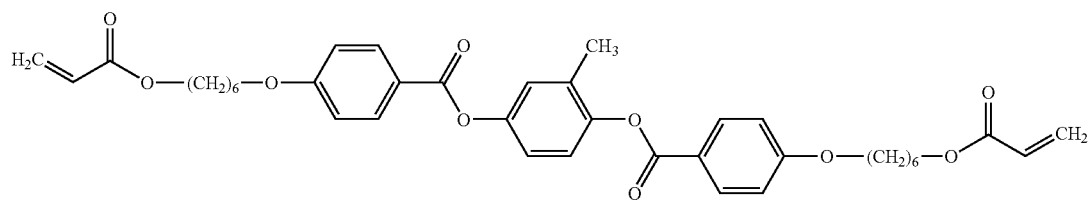

21.8 wt % di-functional LCP acrylate c)

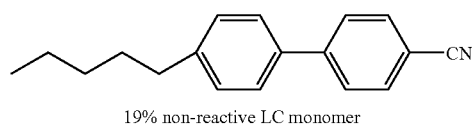

19% non-reactive LC monomer e)

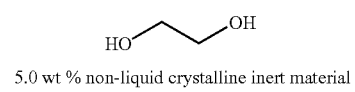

5.0 wt % non-liquid crystalline inert material f)

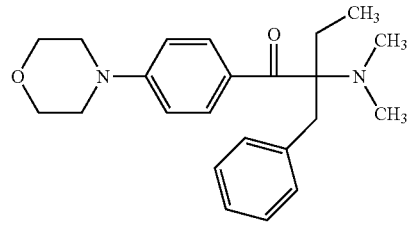

0.6 wt % photo-initiator g)

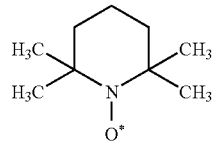

0.1 wt % inhibitor

Components a, b, c, e, f and g are subsequently added in a glass vial and the mixture is magnetically stirred for 15 minutes at 70° C. The resulting mixture is clear and fluid at 70° C. The mixture was furthermore determined to still be photo-polymerizable and also still liquid crystalline and not phase-separated.

Another preferred embodiment is the following mixture C:

a)

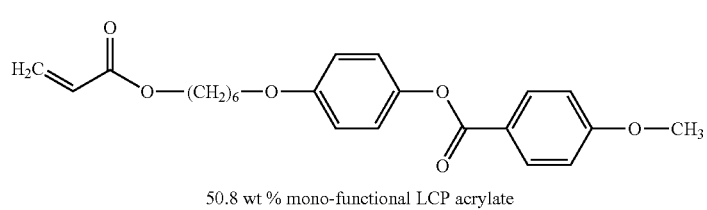

50.8 wt % mono-functional LCP acrylate

-continued

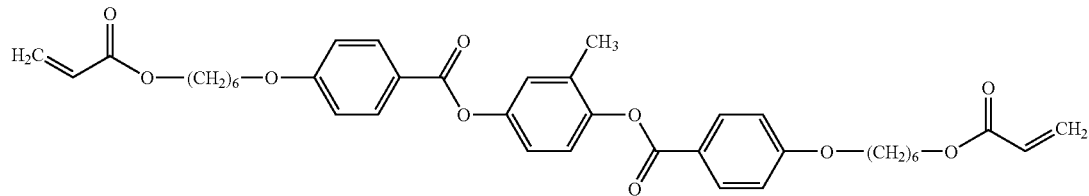

20.8 wt % di-functional LCP acrylate

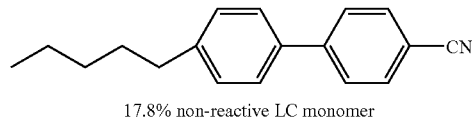

17.8% non-reactive LC monomer

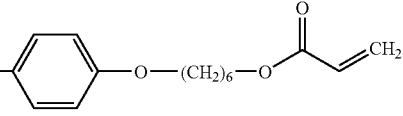

9.9 wt % non-liquid crystalline functionalized monomers

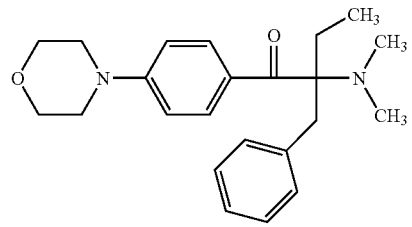

0.6 wt % photo-initiator

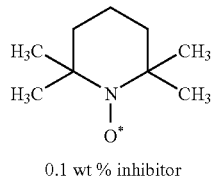

0.1 wt % inhibitor

Components a, b, c, d, f and g are subsequently added in a glass vial and the mixture is magnetically stirred for 15 minutes at 70° C. The resulting mixture is clear and fluid at 70° C. The mixture was furthermore determined to still be photo-polymerizable and also still liquid crystalline and not phase-separated.

The viscosity of mixtures A, B and C are measured using a rheometer with parallel plate geometry. The results are presented in table 2. It is clear that the inclusion of non liquid crystalline material in mixture B has decreased the viscosity when compared to mixture A. It is clear that the inclusion of non-liquid crystalline material in mixture C has decreased the viscosity even further when compared to mixture A, so that for mixture C at 80° C. the viscosity is less than 15 mPa·s.

TABLE 2 viscosity of mixtures A, B and C at different temperatures

|  | 80° C. | 100 | 120 |
|---|---|---|---|
| Mixture A | 24 mPa · s | 14 mPa · s | 9 mPa · s |
| Mixture B | 22.8 mPa · s | 12.6 mPa · s | 8.4 mPa · s |
| Mixture C | 14.5 mPa · s | 8.5 mPa · s | 5.5 mPa · s |

Mixture A was also tested in a heated Spectra inkjet printhead. Results showed stable printing was possible in range of 85° C.-120° C. Tests showed that the printing with Mixture A was stable for at least half an hour of continuous printing.

After printing with the printhead, the printing could be stopped for at least one hour, after which the printing could be restarted without the need for any additional cleaning or purging of the printhead.

This test clearly shows that Mixture A is suitable for printing in an inkjet printer.

In the following, some non-limitative examples are given of suitable components of the mixture described above.

An example of category a) is

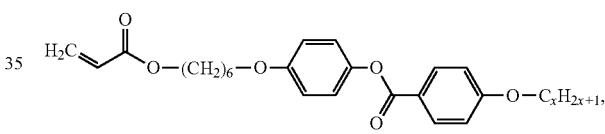

where x is between 1 and 10.

Suitable examples from category d are

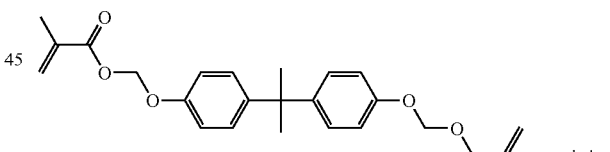
and also

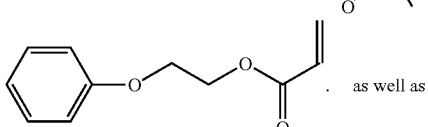
as well as

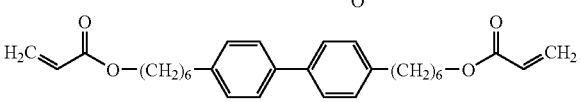

Acrylates have specific advantages in that they have fast curing times as well as a wide choice in suitable initiators. However LCP's with different reactive groups are also known from literature, and could also be applied with the same method. Epoxies for instance have the specific advantages that they provide for good adhesion to many printed surfaces, exhibit relatively small amounts of polymerization shrinkage and are less affected by oxygen inhibition during polymerization. Oxethanes have properties comparable to epoxies, but typically exhibit less polymerization shrinkage. Thiol-ene based polymerization (including both thiol and -ene groups in the molecule structure) is also possible. Vinyl-ethers are also not very sensitive to oxygen inhibition and polymerize very rapidly, but only at relatively high temperatures.

A suitable example of category e) is ethylene glycol.

Suitable examples of category f) are for instance sold by Ciba-Geigy (Switzerland), under the trade names Irgacure and Darocure, and in general polymerization initiators are known in the art. Combinations of different initiators can be used which has a number of potential advantages, of which a number are now described.

Different initiators will give different mechanical properties of the mixture before and after polymerization. Using mono-functional initiators can allow for a low viscosity of the mixture. However, multifunctional initiators tend to be more viscous. The exact choice of initiators also influences e.g. the flexibility and toughness of the polymerized structure. Furthermore, the choice of photo-initiator is dependent on the presence of other absorptive additives in the mixture, which will be described below at category h). It is possible to use mixtures of initiators, which in these cases to allow for a good polymerization of both the top layer of the structure as well as throughout the structure. An initiator that can overcome oxygen inhibition of the surface can be used to initiate polymerization at the surface, whereas another initiators can be used to through-cure the structure. It is also possible to choose initiators in such a way that only the top of the structure polymerizes, but the remaining part remains non-polymerized. The non-polymerized LCP is then still fluid, and can be manipulated by means of for instance electric or magnetic fields, i.e. it remains switchable.

The list of possible additives from category h) contains, but is not limited to, the following examples.

One example of additives is molecules that can act as tracer molecules, such as e.g. DNA-molecules. These can be added in minute quantities, typically with amounts in the order of one part per million (ppm), so that they are very difficult to trace when their exact properties are not known beforehand.

Another example of additives is surfactants, which can enhance alignment of the liquid. These surfactants can either enhance the alignment of the liquid crystalline matrix at the top of the structure, at the bottom or in the bulk or in combinations of those locations. Furthermore, these surfactants can influence the potential phase separation of the mixture or influence the mechanical properties (e.g. viscosity, surface tension) of the mixture on the substrate or can perform a combination of these three functions.

Another example of additives is chiral additives, commonly referred to as chiral dopants, which are used to induce a chiral phase in liquid crystal structures. Such chiral structures reflect light from a specific tunable wavelength range and with a specific handedness, which can either be commonly called left- or right-handed, and the handedness is determined by the handedness of the chirality of the structure. It is noted that one or more of the LCP's from categories a) through c) can also exhibit intrinsic chiral phases, and/or induce such a phase for all the liquid crystal molecules. By making use of chiral LCP's, a chiral structure can be obtained without the use of chiral additives. The person skilled in the art knows many chiral additives. Preferably the chiral additives are also polymerizable, which has the advantage that the temperature dependence of the reflected wavelength is usually decreased.

Other examples of additives are pigments and dyes. Pigments and dyes can be added to give the mixture an intrinsic color by means of absorption of part of the spectrum as well as optionally luminescence in part of the spectrum. Such intrinsic color can enhance the optical effects of the printed structure, for instance by enhancing contrast of (parts of) the printed structure.

Pigments are particles, which do not dissolve molecularly in the mixture whereas dyes can be approximately molecularly dissolved. The choice between pigments and dyes is dependent on various factors. One important factor is the solubility of the dyes or the pigments, with or without the aid of a dispersant, to create a stable ink. Solutions with dyes are generally easier to process than dispersions with pigments, but the optical properties of pigments are usually more stable. Furthermore, certain optical additives are only available as pigments and not as dyes, such as di-electric stacks, whose optical effects are not based on molecular effects, but on effects on a larger scale. Another important factor is the price of pigments, which is usually higher than that of dyes.

Examples of absorbing pigments or dyes are for instance
Absorbing only, meaning that a specific part of the spectrum is absorbed
Photochromic pigments or dyes, which by excitation with light of a particular part of the spectrum reversibly change into another chemical species having a different absorption spectrum from the original chemical species. Non-reversible photochromic pigments and dyes also exist for specific purposes
Thermochromic pigments or dyes, which exhibit a reversible change in absorption spectrum through the application of heat (i.e. at raised or lowered temperatures). Non-reversible thermochromic pigments and dyes also exist for specific purposes
Electrochromic pigments or dyes, which exhibit a change in absorption spectrum through the addition of electron charges
Ionochromic pigments or dyes, which exhibit a change in absorption spectrum through the addition of ionic charges.
Halochromic pigments or dyes, which exhibit a change in absorption spectrum through changes in pH.
Solvatochromic pigments or dyes which exhibit a change in absorption spectrum through changes in the polarity of the solvent which is in contact with them.
Tribochromic pigments or dyes, which exhibit a change in absorption spectrum as a result of friction applied to them.
Piezochromic pigments or dyes, which exhibit a change in absorption spectrum through changes in the pressure applied to them.
Examples of luminescent pigments or dyes are for instance
Fluorescent pigments or dyes, which exhibit absorption of light in a particular part of the spectrum and emission in another part of the spectrum, typically at a lower wavelength, where the absorption and emission of individual photons occur subsequently but with delays of typically nano-seconds.
Phosphorescent pigments or dyes exhibit similar absorption and emission as fluorescent dyes, but due to a different quantum mechanical decay mechanism typically emit photons after absorption with much larger delays of up to hours or days.
Chemoluminescent pigments or dyes, which exhibit emission of photons as a result of chemical reactions of the pigments and dyes. Such reactions are generally non-reversible.
Electroluminescent pigments or dyes, which exhibit emission of photons as a result of radiative recombinations of electrons and holes within the pigments or dyes. Such radiative recombination can occur if an electric current is passed through the pigments or dyes, or alternatively of they are subjected to strong electric fields capable of exciting electron-hole pairs which subsequently recombine.

Triboluminescent pigments or dyes, which exhibit emission of photons as a result of friction applied to them.

Piezoluminescent pigments or dyes, which exhibit emission of photons as a result of pressure applied to them.

Radioluminescent pigments or dyes, which exhibit emission of photons as result of ionizing radiation, such as beta particles, applied to them.

There are also pigments or dyes which combine multiple optical effects within a single additive, or which is in fact an effect which is related to multiple causes concurrently. Examples are Thermochromic pigment capsules which change colour if heated above a certain threshold temperature. At this temperature the crystalline solvent in the capsule melts and effectively lowers the pH. This in turn causes the halochromic compound present to change its absorptive properties.

Photochromic fluorescent dyes are dyes which exhibit fluorescence only after the molecule has absorbed photons from a part of the spectrum which it does not absorb in its subsequent fluorescent state. This effect which is concurrently photochromic and fluorescent, i.e. due to the first absorption not only the absorptive properties of the molecule changes (photochromism) but also the molecule subsequently exhibits fluorescence or a change in its fluorescent properties.

Pigments and dyes can exhibit anisotropic optical properties, depending on their molecular orientation. If anisotropic dye molecules align to a significant degree within the LCP matrix, typically parallel or perpendicular to the LCP alignment, typically caused by a distinct anisotropic molecular shape, these molecules can exhibit their anisotropic optical properties collectively, leading to distinctive optical effects, which remain after polymerization of the LCP matrix. This effect is commonly known as dichroism or pleochroism. Pigments can also exhibit dichroic effects if the particles as such have anisotropic optical properties. However, such properties are difficult to exploit since for a collective effect all pigments have to be effectively aligned in the direction of their inherent anisotropy.

It is possible to create features which exhibit fluorescent dichroism in absorption but not in emission or vice versa. This effect can be achieved for instance by using two fluorescent molecular species, one of which absorbs and emits essentially non-dichroic and the other essentially dichroic. By choosing both species in such a way that the absorbed photon-energy is transferred to the other species, such effects can be obtained. Also, fluorescent molecules can exhibit different degrees of dichroism in absorption and emission, but the effect with using multiple suitably chosen species is in general more pronounced.

UV-absorbing pigments and dyes or pigments can serve several specific purposes. Such UV-protecting pigments and dyes can be present in the printed mixture or applied over the printed structure after curing by another printing step, preferably by means of flexography or offset printing. Also other application methods can be employed, such as bar-coating, doctor blading, spraying or by applying a UV-absorbing substrate on top of the printed substrate.

As these pigments or dyes absorb UV light, they can protect the printed layer, or the substance underneath this layer, from harmful UV-radiation which can lead to degradation of the (mechanical) properties of the structures, such as brittling. During the UV-curing of the printed layer, UV-absorbers can also be used to prevent the deeper parts of the layer of being polymerized, thus allowing for a non-polymerized layer to exist, whereas the top layer is solidified during polymerization. Also, such a non-polymerized layer is not created but there is formed a gradient in the structure if specific components of the mixture diffuse towards or away from the higher polymerized regions during polymerization. Such gradients create new optical effects. For instance, a gradient in the amount of chiral dopant leads to structures after polymerization which exhibit a gradient in the chiral pitch, thus reflecting light over a greater wavelength range than a single pitched structure would. This effect is known as a broadband cholesteric mirror.

Other examples of additives are conductive or semi-conductive additives. Such additives can for example consist of the following group of additives:

nanometer or micrometer sized rods, flakes, spheres or otherwise suitably shaped conductive particles of metals, alloys or semiconductor-based materials made from for example (metals) iron, aluminium or copper or (semiconductors) GaAs, doped silicon or graphite.

semi-conductive conjugated polymers, such as polyphenylene vinylene semi-conductive liquid crystalline molecules, such as oligothiophenes, which are preferably LCP's.

Such conductive additives enable the printing of electronic circuits. Such circuits can be used for instance to create optical effects which are switchable by means of electrical signals. The conducting properties of the structure itself too can be used as an authentification feature. This can be done particularly effectively if elements of electronic circuits, such as FET's, diodes or capacitors are created within the print, since these give rise to designable and clearly identifiable electronic responses. It is possible that the conductive structures are used to make switchable another, adjacent non-conductive printed structure, either of which is not necessarily but preferably applied by means of inkjet printing. Such multi-layered prints are advantageously created sequentially or concurrently, either in a single layer or in separate layers, printed either on top of or next to each other or even on opposite sides of the substrates or on multiple substrates which are assembled together after printing. Furthermore, it is possible to create structures which are conductive and contain electroluminescent or electrochromic additives, which can be addressed (made to change the optical appearance of the feature) by currents flowing through the printed structure itself. Furthermore, by supplying charges of equal or opposite sign to two electrically isolated by adjacent parts of the structure, capacitors can be formed. If such parts of the structure are able to move mechanically, such movement can give rise to e.g. altered optical, mechanical, electrical or magnetic properties of the printed structure, which can be used to authenticate the feature.

It is particularly beneficial that the printed structures are (in part) made from LCP's, since the anisotropic properties of the aligned LCP polymer matrix can enhance the electrical and mechanical properties desired to fully exploit the conductive properties of the print.

Other examples of additives are magnetic additives, such as paramagnetic, super-paramagnetic, diamagnetic or ferri-magnetic particles. Such particles are typically 5 to 500 nm in size. The addition of such particles enables the creation of structures that can be moved mechanically by means of magnetic fields. Again, such movement can give rise to e.g. altered optical, mechanical, electrical or magnetic properties of the printed structure, which can be used to authenticate the feature.

A particular benefit of adding (semi-) conductive or magnetic additives to the prints is that the authentication is straightforward by means of electric and magnetic fields or currents, and the effects can be reversible enabling non-destructive authentication. Furthermore, a particular benefit of inkjet printing such structures is that these additives can be printed in varying structures, thus enabling unique and identifiable responses to electrical or magnetic fields.

It is particularly beneficial that the printed structures are (in part) made from LCP's, since the anisotropic properties of the aligned LCP polymer matrix can enhance the electrical and mechanical properties desired to fully exploit the magnetic properties of the print.

Again it has to be emphasized that the additives mentioned above can either be present together or separately in the mixture. It goes without saying, however, that the total amount of components forming the polymerizable mixture is always 100 wt. %.

As the anisotropic optical properties of the LCP's in the matrix before and after polymerization are dependent on their alignment, the preferred substrates on which is printed induce or do not interfere with the alignment of the LCP's so as to obtain the desired optical effect. Commonly used substrates are rubbed polyimide, as well as rubbed tri-acetyl-cellulose, polyethylene terephthalate, polyethylene or polypropylene. Rubbing causes planar aligning properties for these substrates.

Other substrates, also substrates causing other types of homogenous alignment, are known in the art as well. Common types of alignment are e.g. planar, homeotropic and tilted alignment.

LPP (Linearly Photopolymerizable Polymers) layers can also be used as alignment layers. LPP allows for the patterning of the alignment layer by means of polarized light and thus multi-domain patterning of the alignment layer. Furthermore it is possible to use self-assembled mono-layers (SAM's) as alignment layers, which can easily be applied in a pattern by e.g. printing. Combinations of for instance SAM's and LPP or tri-acetyl-cellulose layers allow for an increased control over the alignment of the LCP's in the azimuthal and polar direction.

Next to the aligning properties of the surfaces, the choice in substrates also determines the interactions between the mixture and the substrate. These interactions can be used to create additional (optical) effects. E.g. the use of hydrophobic of hydrophilic (chemically) patterned surfaces allows for print confinement and thus a higher print resolution and more striking optical effects. A geometrically patterned surface can also be used to confine printed ink. Confinement can lead to printed structures with more controlled geometries, leading to better defined properties which are beneficial for authentication purposes. Such chemical or geometrical patterning of the substrates can be achieved by means of printing, but also other techniques such as for instance embossing, rubbing and lithography.

The optical properties of the employed substrates influence the overall properties of the security feature. Such substrates can be combined, i.e. stacked on top of each other creating a multi-layered security feature, or a security feature created on a stack of substrates each having particularly beneficial properties. Dependent on the preferred optical effects, the substrates can be transparent, absorbing in any range of wavelengths, scattering or reflecting or can comprise patterns of these effects. The substrates can also have other optical properties. Examples are the ability to transmit only one polarization, as is the case with polarization films which transmit only one linear polarization, or the ability to reflect only one polarization, e.g. cholesteric films only reflect one handedness of light.

Furthermore the substrates can change the polarization of transmitted or reflected light, as is the case with for instance retarder films and half wave plates.

The substrates can also contain other authentication features. Examples are holograms, retro-reflecting layers, interference stack reflectors, fluorescent layers, color-shifting layers or features printed by means of flakes. It is also possible to add layers containing other authentication features on top of the LCP polymer structures, via e.g. lamination.

It is preferred that the as-produced features are created such that they can be applied as tamper evident labels to products or documents. Such labels have properties which render the intact removal of the labels very difficult. Such properties could be poor mechanical integrity, for instance features which have low toughness, i.e. low resistance to tearing. Furthermore, the features upon removal can leave behind clear traces of its previous presence, for instance by means of rupture-sensitive ink particles.

It is also preferred that the features can easily be applied to the documents and products. Such application can for instance be by means of hot-embossing or by creating self-adhesive features.

Inkjet printing of LCP's is a very flexible technique, which allows for many novel optical designs, for instance by using multiple ink reservoirs which allows for the concurrent printing of inks with different optical properties. Of course it is also possible to print on top of or underneath layers printed via other printing technique's, such as flexography, laser printing, offset printing, screen printing, micro-contact printing, micro-transfer printing, intaglio printing, gravure printing, roto-gravure printing, reel-to-reel printing, and thermal transfer printing.

Such printing could be done in series or parallel depending on the printing equipment design. All these options enable a great host of embodiments with specific uses for specific purposes. In the following paragraph a few of the options are mentioned, although this is not an exhaustive list of the possibilities of printing LCP's.

The combination of normal black or colored inks with ink jet printing of LCP's can allow for the inclusion of features on top of normal printed information by printing retarding structures on top of an image or text printed with regular ink on a reflection substrate. It can also allow for the enhancement of contrast of cholesteric prints by printing cholesteric LCP mixtures on top of a strongly light absorbing image.

By using inks with identical apparent color but with different reflective properties, such as left-hand and right-hand reflecting cholesteric LCP's, hidden information can be printed which can only be revealed using a polarization sensitive device or machine reader. The combination of color-shifting non-liquid crystal ink layers and printed color-shifting LCP polymer layers creates a highly similar effect, as one ink has a uniform reflection and the other is polarization selective.

Printing several layers on top of each other can enhance reflectivity or enhance the colors printed.

Self-authenticating structures can be printing by using e.g. structured polarizers and a birefringent LCP polymer layer on a reflective surface, which can be folded together to create additional effects. This can also recover encrypted data.

As is already clear from the above descriptions, it is a particular advantage of inkjet printing of LCP's that it is possible to create authentication features with (multiple) overt, covert, forensic and biometric levels of security, which will be explained below. Also, it is possible to use one of multiple options or combinations of options in each level by suitably choosing (combinations of) additives such as pigments and dyes, substrates, printing procedures and designs of the layers present in the authentication features.

Features which incorporate levels of security that are directly apparent (in particular visible) to anyone without the use of additional devices, like the color-shifting effect, which can be seen if a printed chiral nematic structure is tilted, are known as overt. Any overt security feature should be easily recognizable, but very difficult to counterfeit. Other examples are multi-color prints of chiral LCP polymer based color-shifting inks.

Covert levels of security can only be made apparent using simple devices. For instance, the birefringent nature of LCP's can be revealed using simple devices such as polarizers if choosing suitable designs. Examples are nematic structures printed on a reflecting substrate, which shows reflection or no reflection when viewed through a polarizer at 0 or 45 degrees to the alignment axis. Another example is a chiral LCP polymer print, which reflects only one handedness of circularly polarized light. This can be discerned by a circular polarizer. Parts of the printed structure, which could be left un-polymerized, could be electromagnetically switched if having anisotropic dielectric constants, as is the case for many inert liquid crystals. This changes the optical properties of the structures. In use it is sometimes preferred that the covert level is not visible as a security feature (i.e. being without a combined overt level), but consists of e.g. (electro-) magnetically stored information, micro-text invisible to the eye, etc. For both optical and other covert layers it is usually possible to devise a procedure and associated device, which performs a fully automatic authentication.

A more complicated level of security is the forensic level of security. This level is usually only known in detail by a selected group of users, who typically have access to expensive readout equipment. Possibilities for this level are to add tracer molecules to the mixture, which can be traced using highly advanced analysis techniques such as NMR scans. Other options are to analyze the exact ink content, or to investigate a specific size and shape of printed dots.

Finally the biometric level of security allows a feature to store unique information, typically employed for e.g. tracking and tracing or authenticating persons. Due to the flexibility of the inkjet printing process of LCP's, it is possible to print e.g. barcodes, serial numbers, fingerprints and other information. It is also possible to print unique information with LCP's on top of or next to the same information printed with standard inks, allowing for different read-out systems for the printed information, while retaining the authentication features of the LCP's and enabling a simple verification method for consumers by means of straightforward pattern recognition.

The combination of creating authentication features with clearly discernable optical features with the possibility to store unique information (such as a number, a barcode, or an image), makes these features particularly interesting for secure tracking and tracing. Whereas the visible security feature is discernable by consumers, the information is visual and therefore also easily detectable using very easy equipment such as barcode scanners or even camera's in mobile phones. These types of equipment can be easily connected to any type of database system, in which tracking and tracing information is stored. On the other hand, the all visual features can also be used specifically in places where there are no other read-out devices are available due to equipment constraints.

The invention claimed is:

1. A polymerizable solvent-free mixture for ink jetting, having liquid crystalline phases comprising the following components:
    a) 50-80 wt. % mono-functional polymerizable liquid crystals
    b) 10-50 wt. % of a higher functional polymerizable liquid crystals
    f) 0.01-5 wt % initiators
    g) 0.01-5 wt % inhibitors
    h) 0-20 wt % additives,
with the provision that the total amount of the components is 100 wt %, characterized in that the polymerizable mixture has a viscosity smaller than 0.015 Pa·s at 100° C. and yet remaining thermally stable.

2. The polymerizable mixture according to claim 1, characterized in that said mixture further comprises c) 10-30 wt % liquid crystalline inert monomers, preferably from 15-25 wt %.

3. The polymerizable mixture according to claim 2, characterized in that the liquid crystalline inert monomers c) are non-chiral.

4. The polymerizable mixture according to claim 1, characterized in that said mixture further comprises d) 0.01-30 wt % non-liquid crystalline functionalized monomers.

5. The polymerizable mixture according to claim 1, characterized in that said mixture further comprises e) 0.01-30 wt % non-liquid crystalline inert monomers.

6. The polymerizable mixture according to claim 1, characterized in that the components a) and/or b) are acrylates.

7. The polymerizable mixture according to claim 1 characterized in that the additives h) are selected from a group comprising photochromic pigments or dyes, thermochromic pigments or dyes, electrochromic pigments or dyes, ionochromic pigments or dyes, halochromic pigments or dyes, solvatochromic pigments or dyes, tribochromic pigments or dyes and piezochromic pigments or dyes.

8. The polymerizable mixture according to claim 1 characterized in that the additives h) are conductive or semi-conductive additives.

9. The polymerizable mixture according to claim 8 characterized in that the additives h) are selected from a group comprising nanometer or micrometer sized rods, flakes, spheres or otherwise suitably shaped conductive particles of metals, alloys or semiconductor-based materials.

10. The polymerizable mixture according to claim 8 characterized in that the additives h) are selected from a group comprising
    semi-conductive conjugated polymers
    semi-conductive liquid crystals.

11. The polymerizable mixture according to claim 1 characterized in that the additives h) are selected from a group comprising magnetic additives, such as paramagnetic, superparamagnetic, diamagnetic or ferri-magnetic particles.

12. The polymerizable mixture according to claim 1, characterized in that the mixture is aligned by a substrate layers selected from a group consisting of rubbed polyimide, rubbed tri-acetyl-cellulose, rubbed polyethylene terephthalate, rubbed polyethylene, or rubbed polypropylene.

13. The polymerizable mixture according to claim 1, characterized in that the components from e) through f) are selected such that they do not prohibit the alignment of the liquid crystals from components a) through d).

14. The polymerizable mixture according to claim 1, characterized in that the components from a), b) d) and e) are functionalized to form a polymer structure.

15. The polymerizable mixture according to claim 1, characterized in that the components a) through h) are selected such that phase-separation is suppressed at least only before polymerization but preferably also during polymerization.

16. A security feature created with a mixture according to claim 1, characterized by a substrate having a printed pattern containing unique information.

17. The security feature according to claim 16, characterized in that substrates of the security feature contain further authentication features, including holograms, retro-reflecting layers, and interference stack reflectors.

* * * * *